INVENTORS
JACQUES NORMAND
EMILE JULIER

BY: Paul M. Craig, Jr.
ATTORNEY

INVENTORS
JACQUES NORMAND
EMILE JULIER
BY: Paul M. Craig, Jr.
ATTORNEY

INVENTORS
JACQUES NORMAND
EMILE JULIER
BY: Paul M. Craig, Jr.
ATTORNEY

INVENTORS
JACQUES NORMAND
EMILE JULIER
BY: Paul M. Craig, Jr.
ATTORNEY

INVENTORS
JACQUES NORMAND
EMILE JULIER
BY: Paul M. Craig, Jr.
ATTORNEY

Aug. 22, 1967 J. NORMAND ET AL 3,337,687

SYNCHRONOUS MULTIPLEX TELEGRAPHY

Filed Oct. 23, 1962

6 Sheets-Sheet 6

INVENTORS
JACQUES NORMAND
EMILE JULIER
BY: Paul M. Craig, Jr.
ATTORNEY

United States Patent Office 3,337,687

Patented Aug. 22, 1967

3,337,687

SYNCHRONOUS MULTIPLEX TELEGRAPHY

Jacques Normand, Paris, and Emile Julier, Clamart, France, assignors to CIT—Compagnie Industrielle des Telecommunications, Paris, France Filed Oct. 23, 1962, Ser. No. 232,371
Claims priority, application France, Oct. 25, 1961, 877,028
7 Claims. (Cl. 178—53.1)

The present invention concerns an apparatus for receiving a synchronous telegraph modulation and more particularly an apparatus of this type in which the synchronous telegraph modulation is transmitted through a so-called voice-frequency channel.

It is known that synchronous telegraph receivers must be synchronised and brought into phase with the transmitting apparatus.

It is also known that a number of telegraph transmission channels, working with start-stop modulation, can be multiplexed by time division in a single channel working with synchronous modulation at the transmitting end of the said single channel, and that the synchronous signals of this single channel may be re-distributed or demultiplexed at the receiving end of the single channel to form a plurality of telegraph reception channels, working with start-stop modulation. In such a multiplex system, the de-multiplexing device must obviously be and remain in synchronism with the multiplexing device.

The main object of the invention is to synchronise the de-multiplexing operation at the receiving end with the multiplexing operation at the transmitting end in a start-stop-to synchronous multiplexing and synchronous to-start-stop de-multiplexing system.

In accordance with the invention, the signals serving to synchronise the de-multiplexing system are the switching signals appearing on the various channels to be multiplexed.

In the following descriptions of the invention, the term "switching signals" will refer to the following signals:

(1) A waiting signal, called the "permanent positive" signal, transmitted between two non-contiguous successive characters. In a switchable channel, this signal means that the channel is occupied owing to an established connection, but that no traffic is proceeding.

(2) A negative signal of a duration of a hundred and fifty milliseconds (tolerance: ±11 ms.), called the "connecting signal," which is used during the establishment of international communications to inform the caller that he is connected to the called subscriber.

(3) A signal of a duration of more than three hundred milliseconds, called the "permanent negative" signal, characterising a free channel.

The change-over to the permanent negative signal characterises notably a request for clearance.

This signal may be regarded as an uninterrupted succession of negative signals of a duration of one hundred and fifty milliseconds of the type referred to in (2).

Therefore, only two switching signals will be considered, which will be called the "permanent positive" and "permanent negative" signals. These switching signals must be transmitted in forms which clearly differentiate them from the normal telegraph signals.

Signals having a particular wave form which may be used as switching signals have already been proposed in the prior art. With regard to direct-current channels, French Patent No. 1,206,928 of May 22, 1958, in the names of Roger Sourgens and Raymond Chollet, entitled "Complementary Signalling for Rhythmic Telegraphy," proposes as complementary signals to be used for the switching signals which consist of the substitution, for certain code elements, of a periodic signal whose frequency is twice the repetition frequency of the normal code elements. In French Patent No. 1,257,671 of Feb 5, 1960, in the names of Roger Sourgens and of the first-named of the present inventors, entitled "Complementary Signalling for Coded Transmissions," trivalent supplementary combinations are used as switching signals.

In the case of "voice-frequency channels," it is possible to produce supplementary combinations in switching signals by using alternately two types of modulation. For example, if the normal combinations are transmitted with frequency modulation and are represented by two frequencies, on either side of a central frequency, the supplementary combinations may be transmitted by using, for one or more code elements, either amplitude modulation or phase modulation, or by using the central frequency itself. In this connection, attention is drawn to French Patent No. 1,268,524 of June 20, 1960, in the names of Roger Sourgens and the first-named of the present inventors, entitled "Carrier-Current Telegraph Transmission System Employing Complementary Signals," in which frequency modulation is employed for the transmission of the normal combinations and a phase change is effected for characterising supplementary combinations.

In the arrangement of the invention, the constitution of the supplementary combinations by which the switching signals are translated is of no importance. It is merely necessary that the supplementary switching combination should be distinguished as such from the alphanumerical combinations, which requires one or two code elements, for example two, and that the additional combinations employed should permit of distinguishing the two switching signals, i.e. the permanent positive signal and the permanent negative signal, which necessitates only one code element. There therefore remain two code elements of the supplementary combinations (or three if it is assumed that the supplementary combination is recognised as such by a single code element) to designate the number of the start-stop channel to be multiplexed by time division in the single synchronous channel.

Now, with use of two code elements, it is possible to distinguish the switching signals of four channels at most. Three code elements make it possible to distinguish the switching signals of eight channels at most. If, for example, it is desired to multiplex by time division ten telegraph channels on a common synchronous channel, it is possible to use for the control of the de-multiplexing at the receiving end of the synchronous channel, the switching signals, or more exactly, the supplementary combinations, of three component start-stop channels, while the fourth available supplementary combination serving to characterise the other seven component start-stop channels is not utilised in the adjustment of the de-multiplexing synchronism.

It will be apparent from the foregoing that each time a component start-stop channel is in the so-called switching situation, i.e., is brought to permanent positive, or brought to permanent negative (the word "permanent"

meaning only that this positive or negative lasts at least a predetermined time), a supplementary switching combination is transmitted along the synchronous channel and this supplementary switching combination characterises by its elements (1) the fact that it is a supplementary switching combination, (2) the nature of the switching signal and (3) the start-stop channel identification along which this switching signal is now transmitted (the latter designation cannot exist for certain component start-stop channels when the number of component start-stop channels is greater than the combinations permitted by the elements of the supplementary switching combination which are reserved for the said designation).

Moreover, the multiplexing arrangement also transmits a supplementary switching combination to take into account the fact that the transmission cycle of the synchronous channel is shorter than the shortest transmission cycle that can be encountered along the start-stop channels. If one of the start-stop channels transmits at its maximum speed during a given interval of time, it will not be in a switching situation during any of this interval. Nevertheless, owing to the difference in timing of the synchronous and start-stop cycles, one synchronous cycle will ultimately be gained at the end of a certain time and one supplementary switching signal can be sent during this additional synchronous cycle.

The telegraph receiver intended for de-multiplexing multiplex signals transmitted along a synchronous channel into channel signals transmitted along start-stop channels comprises a telegraph receiver, a member for detecting supplementary switching combinations, a store for the synchronous channel, stores for the start-stop channels, means for transfer from the store of the synchronous channel into the stores of the start-stop channels, a time base and means for setting the time base on the one hand in the position corresponding to the reception of a code element of given number and on the other hand in the position corresponding to the commencement of the time allocation reserved for a start-stop channel when a supplementary switching combination is received.

In order to facilitate the understanding of the whole arrangement, the equipment employed for the transmission along the synchronous channel is hereinafter briefly described in the case, given by way of example, where it is desired to multiplex a start-stop channel having a speed of fifty bauds and four start-stop channels having a speed of fifty bauds, these four channels being worked at quarter-speed.

The modulation received from each of these channels is so analysed as to produce the recording of the five elements of a character in five bistable trigger circuits serving as a primary store. These five items of information are thereafter transferred into five other bistable trigger circuits serving as a secondary store when the latter store is itself empty. The use of two stores merely has the object of absorbing any irregularities in the rate of the start-stop reception.

The contents of the secondary stores of the different channels are thereafter successively transferred, under the control of the synchronous equipment, into a common tertiary store, exploration of which renders possible the transmission along the synchronous channel.

All these functions, i.e. exploration, recording and transfer of stores, are completely conventional in the computer art.

The transmission along the synchronous channel is effected with the aid of conventional frequency-modulation harmonic telegraphy.

It is obviously very easy, by interchanging the transfer wires extending from a secondary store to the tertiary store, to transmit in any order along a synchronous channel the elements received from a start-stop channel. Moreover, the use of bistable trigger circuits as stores makes it possible to transmit the elements with direct polarity or with reversed polarity, depending upon the side of the trigger circuit to which the transfer wire is connected.

If the secondary store is empty at the time when the synchronous equipment effects the transfer to the tertiary store (case of a waiting signal), a supplementary trigger circuit, which normally becomes operative at the instant of the transfer from the primary store to the secondary store, remains inoperative. Its state is transferred into the synchronous equipment and brings about, during the exploration of one of the elements of the tertiary store (for example the third) the control of a blocking member, which is a conventional member in the transmission art. The said blocking member, which is disposed between the harmonic telegraph transmission equipment and the synchronous channel, prevents the transmission of any frequency into the line.

Where it is desired to transmit a permanent negative, the process is entirely similar: the transfer from the primary store to the secondary store does not take place and the supplementary trigger circuit hereinbefore referred to remains inoperative. The blocking member is therefore actuated in the same way. The only difference as compared with the preceding case is that one of the trigger circuits of the secondary store is directly actuated by the "permanent negative" signal and changes its state. The corresponding element is therefore transmitted along the synchronous channel with opposite polarity to that which it has in the case of the waiting signal.

Finally, the supplementary combinations of switching signals are transmitted along the synchronous channel in the form of combinations characterised by the suppression, to a quasi-null value, of the amplitude of the frequency modulated signal during the exploration of one of the five elements (the third in the example given). One of the other four elements indicates, in accordance with its polarity, that it is a question of a waiting signal or of a permanent negative. The other three elements, owing to the polarity reversals of which the possibility has hereinbefore been indicated, may be characteristic of the start-stop channel along which the waiting signal or the permanent negative to be transmitted has been set up.

The invention will be more readily understood from the description which will now be given. There has been taken by way of example in the description the case in which the component start-stop channels are a start-stop channel having a speed of fifty bauds and four start-stop channels having a speed of fifty bauds, these four channels being worked at quarter-speed. The cycle of a start-stop channel at 50 bauds with 7.5 elements has a duration of 150 milliseconds. If the timing is normal, the cycles will follow each other without interruption; however, if the timing is a quarter of the normal timing, one modulating cycle will be followed by three cycles of "silence" (absence of modulation). A total or overall cycle is thus obtained at the beginning of $4\times150=600$ milliseconds. The corresponding cycles are therefore 150 milliseconds and 600 milliseconds. The cycle of the synchronous channel is 72.90 milliseconds. The description will be given with reference to the accompanying drawings, in which:

Figure 3:
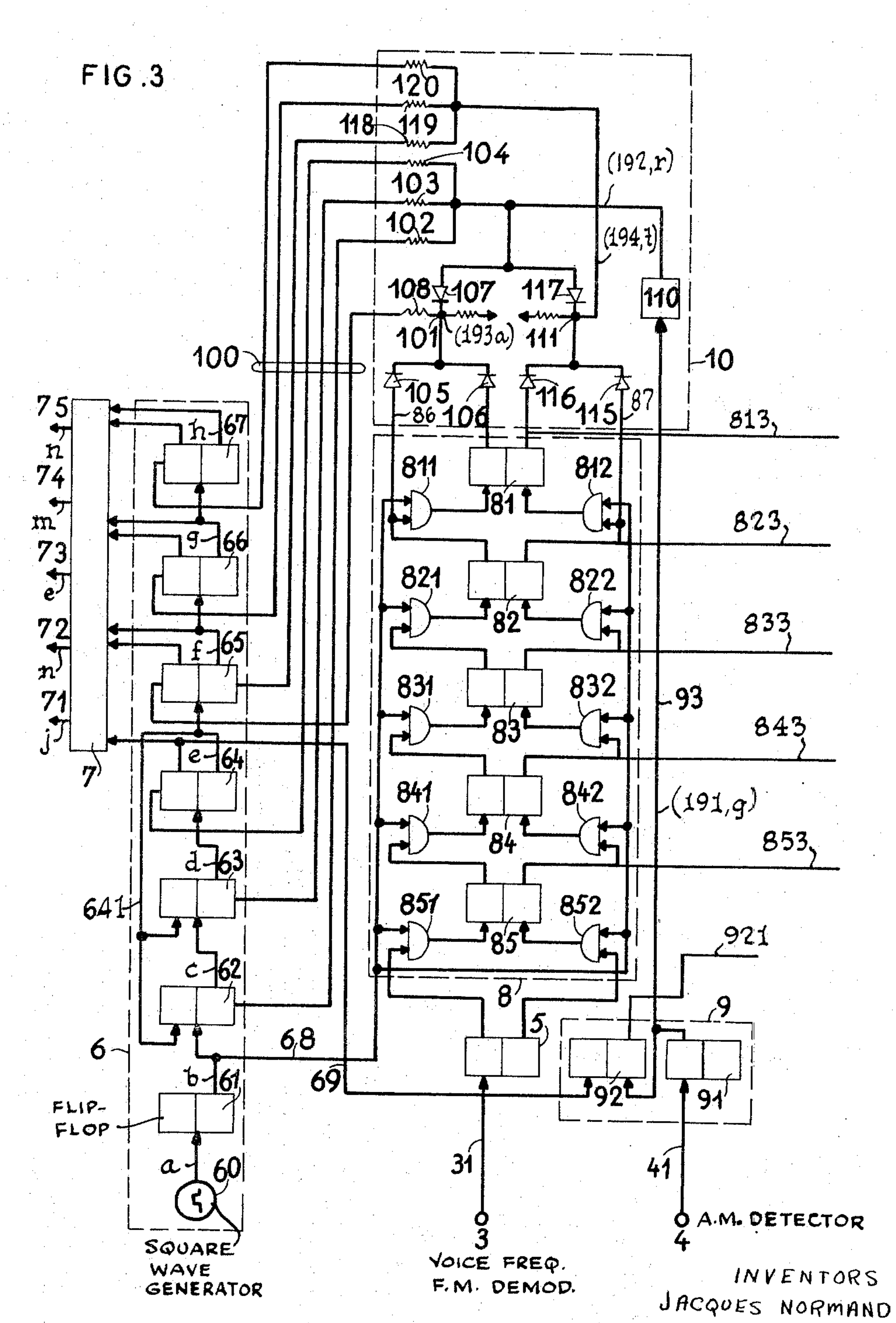

FIGURE 3 diagrammatically illustrates the same arrangement.

Figure 4:
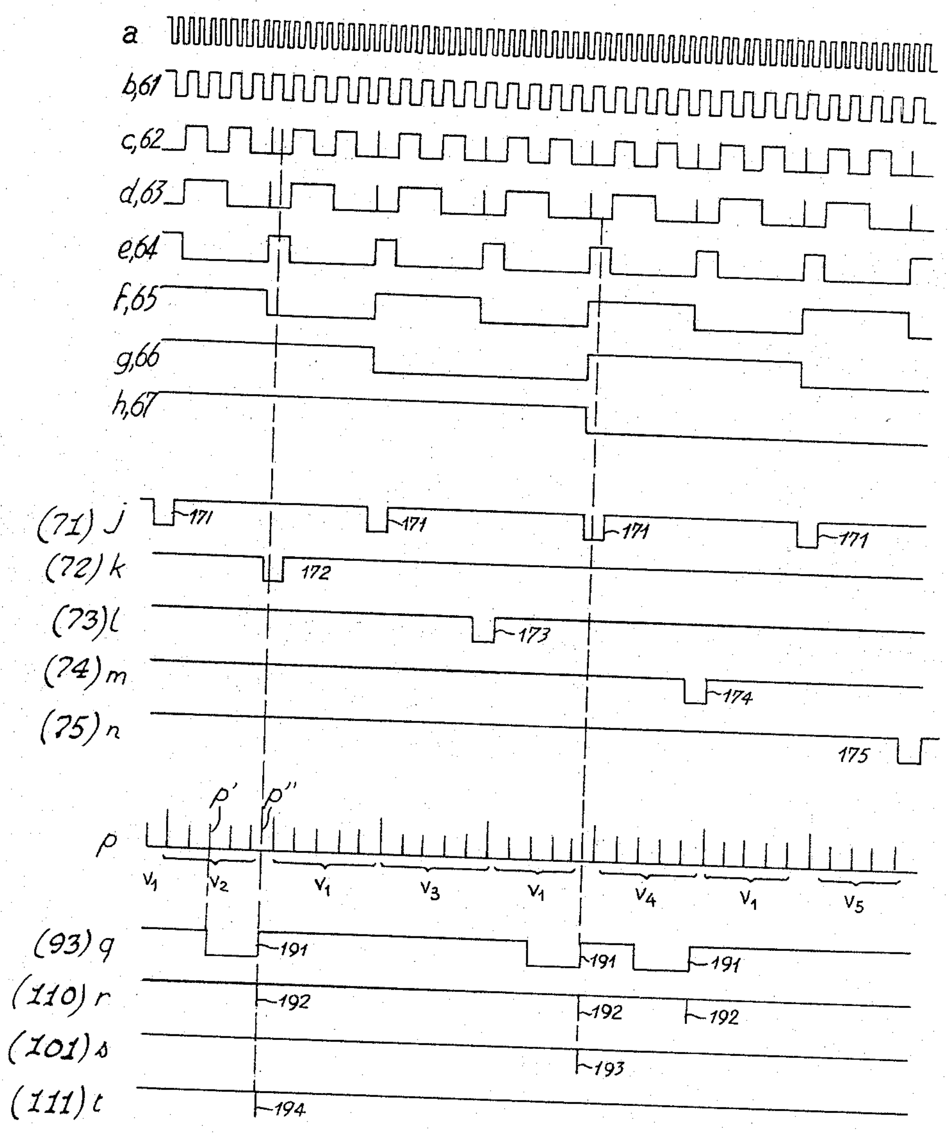

FIGURE 4 is a time diagram explaining the operation of the arrangement, and

Figure 5A:
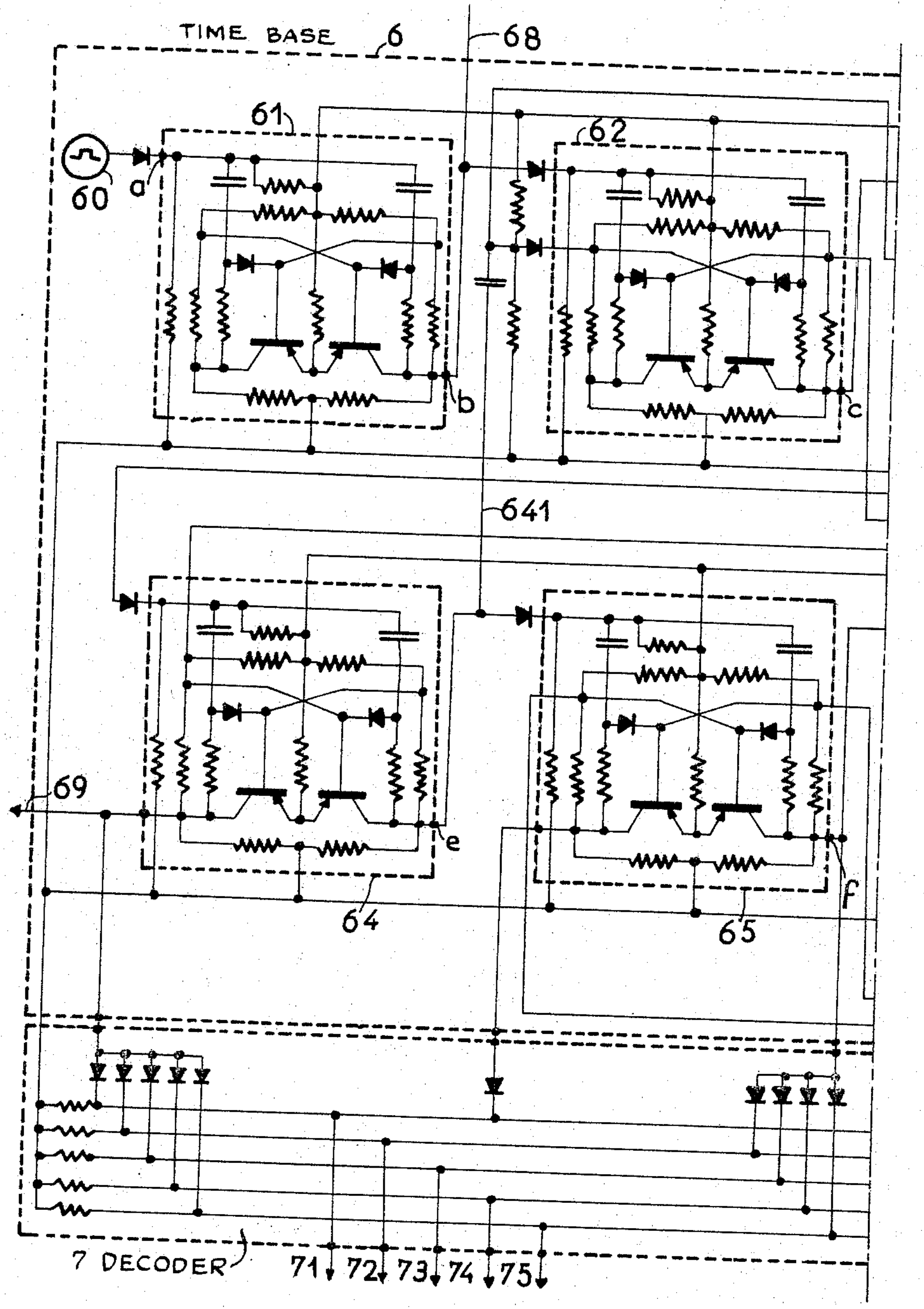
Figure 5B:
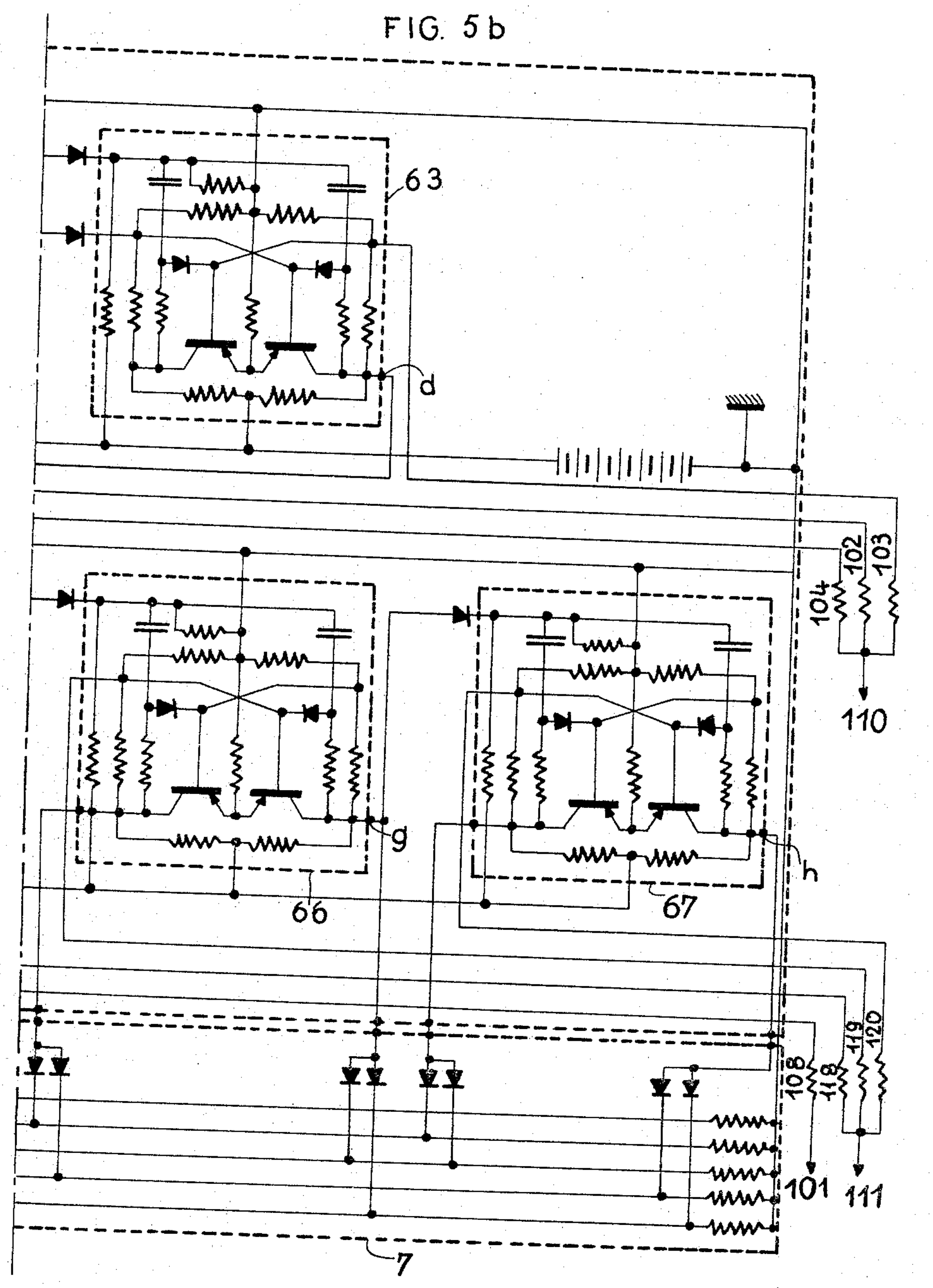

FIGURES 5*a* and 5*b* are detailed diagrams of the time base.

Figure 1:
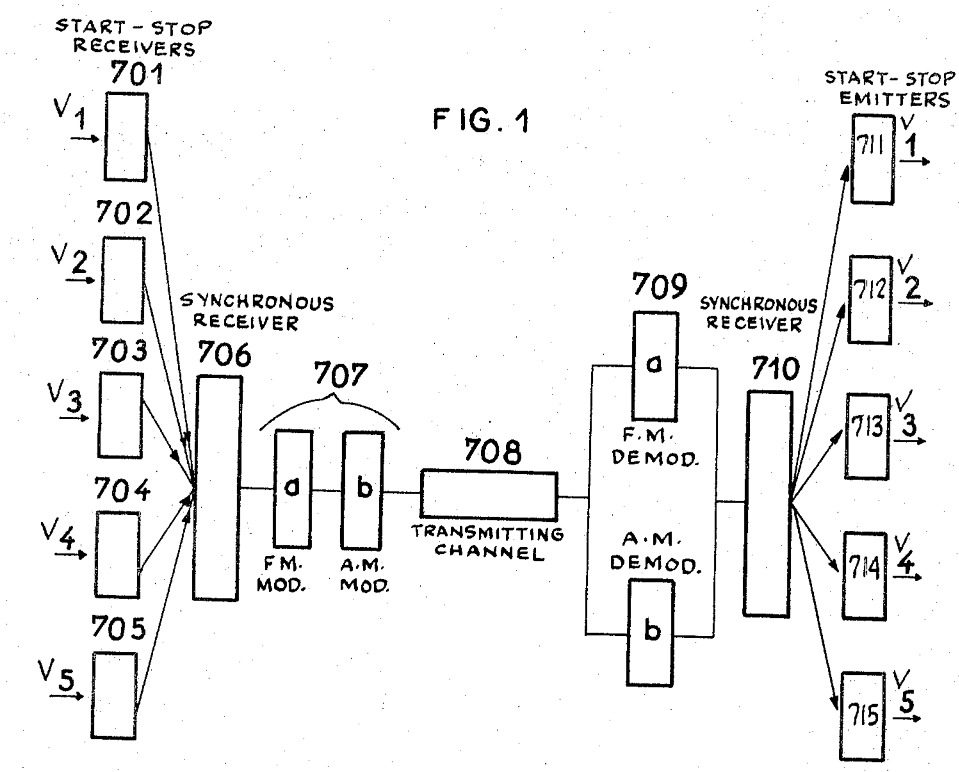
FIGURE 1 is an overall diagram of the transmit-receive installation comprising receiving arrangement according to the invention.

In FIGURE 1, the members 701 to 705 are start-stop receiving units, of which there is one to each start-stop channel, which channels are numbered $V_1$ to $V_5$. It will be assumed, for example, that the channel $V_1$ is a normal 50-baud start-stop channel and that the channels $V_2$ to $V_5$ are 50-baud start-stop channels worked at quarter speed. In the units 701 to 705, the start-stop modulation received is analysed and the code elements are successively recorded on the five flip-flops of a primary store. At the end of the receiving cycle, the elements recorded in the primary store are transferred en bloc into a secondary store, in which they remain until the synchronous transmission unit described in the following can transmit them. The secondary store therefore has the object of absorbing any irregularities in the rate of the start-stop reception. The start-stop receiving equipment also recognises the waiting signal and the permanent negative signal. It produces the corresponding coding of the secondary store. It then indicates to the synchronous transmission unit that the recorded signal is a switching signal.

The member 706 is a synchronous transmission unit which successively transfers into a signal tertiary store the elements recorded in the secondary stores of the five start-stop channels $V_1$ to $V_5$. It thereafter transmits these elements in series form to the frequency-modulation harmonic telegraph modulator unit 707(*a*). A particular signal is used by the member 707(*b*) to suppress the frequency when a switching signal is to be transmitted.

The member 707(*a*) is the above-mentioned harmonic telegraph modulator. 708 represents the harmonic transmission path, and 709(*a*) is the harmonic telegraph demodulator unit.

The member 710 is the synchronous receiving equipment which receives the elements of the synchronous modulation coming from the demodulator unit 709(*a*). A special member 709(*b*) in parallel with the member 709(*a*) detects the absence of frequency and then supplies to the synchronous receiving unit 710 a signal indicating that the combination received corresponds to a switching signal. The synchronous receiving unit 710 also effects the synchronisation of the receiver with the transmitter and the automatic phasing (or automatic rephasing in the case of an accidental loss of phase).

The members 711 to 715 which correspond to the channels $V_1$ to $V_5$ respectively are start-stop transmission units which consecutively receive the elements recorded in the store of the synchronous receiving unit 710. Each of the start-stop transmission units transmits these elements in the form of a series modulation with the addition of the start and stop elements. When it receives the corresponding signals from the synchronous receiving unit, it restitutes the switching signals.

The devices which constitute the present invention affect the members 710 to 715.

Figure 2:
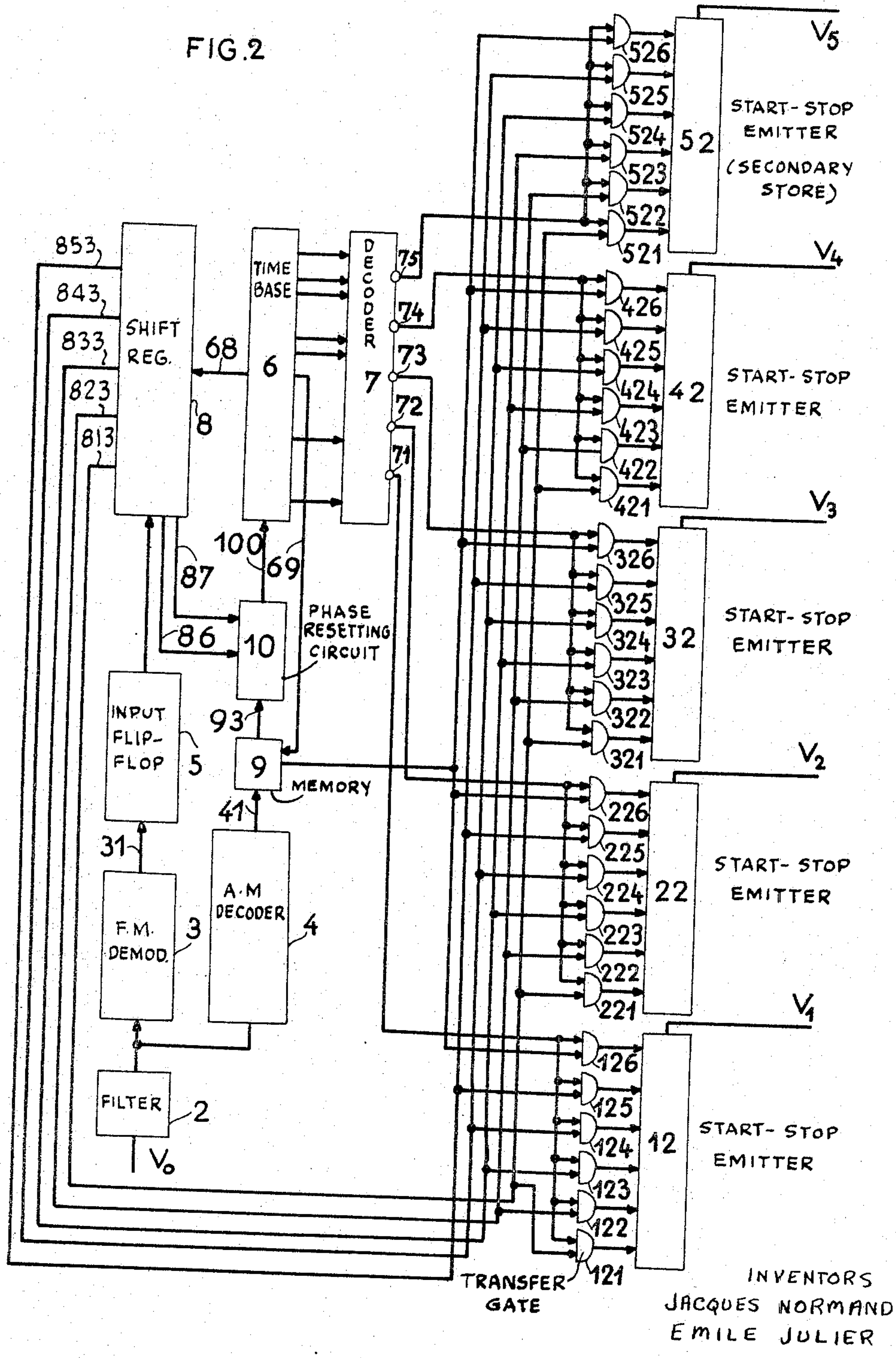
FIGURE 2 is a block diagram showing the structure and the connections of the de-multiplexing arrangement of the invention.

Referring to FIGURE 2, $V_0$ denotes a synchronous receiving channel, 2 a receiving filter of conventional type used in harmonic telegraphy, 3 a harmonic telegraph receiver, 4 a member for detecting predetermined telegraph combinations, 5 an input flip-flop, 6 a time base, 7 a decoding matrix, 8 a primary step-by-step store associated with the synchronous channel and 12, 22, 32, 42, 52 secondary stores associated with the start-stop channels $V_1$ to $V_5$.

The transfer between the step-by-step store 8 associated with the synchronous channel and a particular store 9 on the one hand, and the stores 12, 22, 32, 42, 52 on the other hand takes place through gate circuits 121–126, 221–226, 321–326, 421–426, 521–526 which are controlled by a decoding matrix 7, which is in turn dependent in its operation upon the time base 6. The said matrix produces control signals which connect the store 8 with one of the stores 12, 22, 32, 42, 52 for the purpose of transfer of information at the end of each rhythmic cycle and in a certain predetermined order, which order in accordance with the invention is as follows: $V_1$–$V_2$–$V_1$–$V_3$–$V_1$–$V_4$–$V_1$–$V_5$ with the channel $V_1$ operating at normal speed and the channels $V_2$–$V_5$ operating at quarter speed.

The circuit 4 is a circuit which recognises the supplementary switching combinations. If these supplementary switching combinations are used, for example, an unmodulated element, that is to say, one in which both the carrier frequency characterising the positive elements and the carrier frequency characterising the negative elements are absent, the circuit 4 is provided as an amplitude detector of known type. When a supplementary switching combination is received, it is detected by the detector 4 by means of one of its elements, which is characteristic, and the start-stop channel to which it is related is detected by means of other elements by the primary store 8. The information relating to the fact that it is a question of a supplementary switching combination is transmitted from the detector 4 to the control circuit 10 by the connection 93 via store 9 and the information relative to the start-stop channel under consideration is transmitted to this same control circuit through the connections 86 and 87. The control circuit 10 then acts on the time base 6 through appropriate connections 100 in accordance with a process which will be described with reference to FIGURE 3.

Referring now to FIGURE 3, the time base 6 is formed of a square wave signal generator 60 having a period of 7.29 milliseconds, represented on the line *a* of FIGURE 4, and of seven binary scalers 61–67. The output of the binary scaler 64 is applied through the connection 641 to the binary scalers 62 and 63, and consequently the period of the binary scaler 65, which would be $$32 \times 7.29 = 233.28$$

milliseconds with conventional shift register configuration, becomes $233.28 - 7.29\ (4+8) = 145.80$ milliseconds. The lines *b, c, d, e, f, g, h* represent respectively the output signals of the binary scalers 61–67. The rhythmic period of 72.90 milliseconds is equal to a half-period of the scaler 65. It is also the allocation time interval of a channel in the multiplexing.

The time base 6 is connected to the decoding matrix 7, which determines the time allocations reserved in the synchronous transmission for the five multiplexed start-stop channels $V_1$ to $V_5$. In the course of the synchronous transmission, each allocation of time reserved for the transmission of the data originating from a start-stop channel is called a "synchronous cycle," and these synchronous cycles may be classified according to their order of appearance in the synchronous channel within the time period, that is to say, in the order 1, 2, 3, 4, etc. In the system under consideration, if the cycle 1 is allotted to the channel $V_1$, taking into account the timing provided by decoder 7, one obtains the following allotment of the cycles: The cycles of orders 1, 3, 5, 7 . . . are allocated to the signals emanating from the normal-speed start-stop channel $V_1$, the cycles 2, 10, 18, 26 . . . are allocated to the signals emanating from the first quarter-speed start-stop channel $V_2$, the cycles 4, 12, 20, 28 . . . are allocated to the signals emanating from the second quarter-speed start-stop channel $V_3$, the cycles 6, 14, 22, 30 . . . are allocated to the signals emanating from the third quarter-speed start-stop channel $V_4$ and the cycles 8, 16, 24, 32 . . . are allocated to the signals emanating from the fourth and last quarter-speed start-stop channel $V_5$. This allocation of cycles is controlled by the timing signals at the terminals 71, 72, 73, 74, 75 of the decoding matrix 7, respectively, the signals 171 of the line *j*, 172 of the line *k*, 173 of the line *l*, 174 of the line *m*, and 175 of the line *n* of FIGURE 4, which control the opening of the transfer gate circuits 121–126, 221–226, 321–326, 421–426, 521–526. As already stated, these groups of gate circuits open the transfer connections between the synchronous store 8 and the start-stop stores 12, 22, 32, 42, 52.

It will be seen from the diagrams of the lines *j, k, l, m, n* of FIGURE 4 that the transfer signals 171–175 are set up at the outputs 71–75 of the decoding matrix 7 in the order 71, 72, 71, 73, 71, 74, 71, 75. This order of succession is in fact that of the normal-speed start-stop channel $V_1$, which is sampled one cycle out of two and of the four quarter-speed start-stop channels $V_2$ to $V_5$ which are sampled one cycle out of eight.

The primary store 8 is a shift register of the conventional type. It comprises five flip-flops 81–85 and ten gate circuits for transfer from one flip-flop to the succeeding flip-flop. These gate circuits 811, 821, 831, 841, 851, 812, 822, 832, 842, 852 are controlled through the connection 68 by pulses derived from the square wave output pulses of the binary scaler 61. The synchronous code elements, coming from the receiver 3 through the connecting wire 31, are applied to the input flip-flop 5, of which the outputs in phase opposition are connected to the two inputs of the flip-flop 85 of the step-by-step store 8 through the gate circuits 851 and 852.

The line *p* of FIGURE 4 represents the times of the reception of the synchronous elements of various channels $V_1$ to $V_5$.

When the five elements of a synchronous combination, for example the combination relative to the normal-speed start-stop channel $V_1$, have been recorded in the flip-flops 81 to 85 of the rhythmic store 8, a transfer pulse derived from the pulse 171 of the line *j* is set up at the output 71 of the decoding matrix 7 opens the gate circuits 121–126 and produces the transfer of the code elements into the secondary store 12.

On reception of a supplementary switching combination, the absence of carrier frequency in one of the elements of the combination (the third code element in the example described) is detected by the amplitude detector 4 connected in shunt to the harmonic telegraph receiver 3. A pulse is applied through the connecting wire 41 to the monostable flip-flop 91 of particular store 9. This monostable flip-flop produces a delay (line *q* of FIGURE 4) which is so adjusted that the positive pulse obtained by derivation from the pulse 191 and transmitted through the wire 93 is situated approximately midway of the time interval during which the fifth element of the rhythmic combination is recorded in the flip-flop 85 of the step-by-step store 8. As already stated, it has been assumed in the line *q* that this element of the supplementary switching combination which characterised it as such was the third element and it will be seen on this line that the leading flank of the pulse 191 coincides with the beginning *p'* of the third element and the rear flank with the mildpoint *p''* of the recording period of the fifth element.

The pulse 191 controls on the one hand the device 10 controlling the time base and on the other hand the flip-flop 92 (FIGURE 3), which records the fact that the combination received is a supplementary switching combination. The state of the flip-flop 92 is transferred by means of the connection 921 (FIGURES 2 and 3), like that of the primary store 8, into that one of the stores of the start-stop channel which is concerned, under the transfer control produced by the pulses 171–175 (FIGURE 4). The flip-flop 92 is returned to the inoperative state once per synchronous cycle by way of the scaler 64 and the connection 69 (the signal of the line *e* of FIGURE 4 will be found, in reversed form, at the connection 69).

The control device 10 consists of an inverting amplifier 110 having the object of reversing the polarity of the positive pulse derived from the signal 191 of the line *q* of FIGURE 4, and of a number of gate circuits. The inverted pulse 192 (line *r* of FIGURE 4) which, as has been seen, coincided approximately with the mid-point of the fifth synchronous element, designated *p* hereinabove, is applied through the resistances 102, 103, 104 to the binary scalers 62, 63, 64 of the time base 6, which are immediately driven to be respectively conductive on the left side, conductive on the left side and conductive on the right side, which state corresponds to the reception of the fifth element. Of course, when the time base 6 is in the appropriate state, the inverted pulse 192 only confirms this state.

This same pulse 192 permits the setting of the time base in the positions corresponding to the time allocations reserved for the normal-speed start-stop channel $V_1$ and to the first quarter-speed start-stop channel $V_2$. In the described example, the time base is not set in the positions corresponding to the time allocations reserved for the other three quarter-speed start-stop channels $V_3$ to $V_5$, although this is possible, since it has been seen that each supplementary switching combination had three elements available for characterising a start-stop channel number and that consequently eight different start-stop channels could be characterised. Now, there are five channels here.

The supplementary switching combinations relative to the normal-speed start-stop channel $V_1$ have their first two code elements negative and the supplementary switching combinations relative to the first quarter-speed start-stop channel $V_2$ have their first two code elements positive. The supplementary combinations of the other three quarter-speed channels (channels $V_3$, $V_4$, $V_5$) have a first code element negative and a second code element positive.

When the first two code elements are negative, the diodes 105 and 106 are non-conductive. The pulse 192 is applied to the gate circuit consisting of the three diodes 105, 106 and 107, which is open to negative pulses. This results in the application of a pulse 193 (line *s* of FIGURE 4) through the resistance 108 to the binary scaler 65, which it renders conductive on the right side, that is to say, brings into the state corresponding to the time allocation relative to the normal-speed start-stop channel $V_1$. It will be seen that at the vertical of the pulse 193 the square wave of the line *f* is positive. The diodes 115 and 116 are, in this case, conductive and their common point 111 is at a potential in the neighbourhood of earth potential. The gate circuit 115–116–117 is non-conductive to negative pulses.

When the first two code elements are positive, the diodes 115 and 116 are non-conductive. The pulse 192 is applied to the gate circuit consisting of the three diodes 115–116–117, which is open to negative pulses. This results in the application of a pulse 194 (line *t* of FIGURE 4) through the resistances 118, 119, 120, respectively, to the binary scalers 65, 66, 67, which it renders respectively conductive on the left side, conductive on the right side and conductive on the right side, that is to say, which it brings into the state corresponding to the time allocation relative to the first quarter-speed start-stop channel $V_2$. It will be seen that at the vertical of the pulse 194 the square wave of the line *f* is negative, that of the line *g* positive and that of the line *h* also positive. The diodes 105 and 106 are conductive in this case and their common point 101 is at a potential in the neighbourhood of earth potential. The gate circuit 105–106–107 is non-conductive to negative pulses.

When the first code element is negative and the second positive, the gate circuits 105–106–107 and 115–116–117 are both non-conductive. No pulse acts on the time base.

FIGURE 5 is the detailed circuit diagram of the time base 6 and the decoding matrix. The binary scalers 61–67 are two-transistor flip-flops of a conventional type.

Of course, it is possible to modify the invention in many ways, notably with regard to those elements of the supplementary switching combinations which characterise the fact that it is a question of a supplementary switching combination and the number of the start-stop channel to which a given combination relates. It is here verified that, at the instant of the application of a pulse derived from that one of the elements of the supplementary switching combination which characterises the said supplementary combination, the time base is in fact in the rhythmic cycle relative to the start-stop channel under consideration. Obviously, it would be possible by appropriately delaying the said pulse to verify that the time base is in fact in the rhythmic cycle relative to the immediately subsequent start-stop channel in the multiplexing order.

We claim:

1. In a multiplex telegraphy system having a plurality of start-stop channels providing multi-bit information signals and switching signals embodying supervisory information, means for multiplexing said start-stop channels by time division into a single synchronous channel, and means for de-multiplexing said synchronous channel in synchronism with said multiplexing operation to reproduce said original start-stop channels, the improvement essentially consisting of means for effecting synchronization of said de-multiplexing operation, comprising:

means associated with said multiplexing means for inserting synchronizing signals in the form of a supplementary switching combination in place of said switching signals in said synchronous channel including at least one bit identifying said switching signal and only one bit position indicating that the channel contains a supplementary switching combination during the time allocated to a start-stop channel whenever that channel is in a switching state, said supplementary switching combination being advanced on the start-stop channels themselves, at the exclusion of a channel being reserved especially for this purpose, and synchronizing means associated with said de-multiplexing means for synchronizing said de-multiplexing operation in response to said synchronizing signals, wherein said synchronizing means includes detecting means for detecting the receipt of a supplementary switching combination and the identification of the start-stop channel to which said supplementary switching combination relates in accordance with bit information provided by said combination, wherein said synchronizing means further includes time base means for synchronizing the reception of ordinary synchronous combinations and of supplementary switching combinations and the synchronous cycles corresponding to each start-stop channel to be de-multiplexed, further including means applying said synchronizing signals to said time base means at the time of receipt thereof for correct synchronization thereof with said multiplexing operation, wherein said detecting means includes a circuit for deriving a pulse from said supplementary switching combination indicating that it is a supplementary combination and control circuit means for detecting from said supplementary switching combination the identification of the start-stop circuit to which said supplementary combination pertains and for generating pulses representative of this channel, and further including means for applying said pulses generated by said control circuit means to said time base means for setting said time base means to the state representative of that state during the synchronous cycle reserved for the related start-stop channel.

2. In a multiplex telegraphy system having a plurality of start-stop channels providing multi-bit information signals and switching signals embodying supervisory information, means for multiplexing said start-stop channels by time division into a single synchronous channel, and means for de-multiplexing said synchronous channel in synchronism with said multiplexing operation to reproduce said original start-stop channels, the improvement essentially consisting of means for effecting synchronization of said de-multiplexing operation, comprising:

means associated with said multiplexing means for inserting synchronizing signals in the form of a supplementary switching combination in place of said switching signals in said synchronous channel including at least one bit identifying said switching signal and only one bit position indicating that the channel contains a supplementary switching combination during the time allocated to a start-stop channel whenever that channel is in a switching state, said supplementary switching combination being advanced on the start-stop channels themselves, at the exclusion of a channel being reserved especially for this purpose, storage means in said de-multiplexing means effecting step-by-step storage of said synchronous channel and secondary storage means for effecting storage of said start-stop channels, means for transferring the output of said storage means into said secondary storage means in accordance with the sequence of said multiplex operation, time base means for controlling the sequence of operation of said transferring means in accordance with predetermined states generated sequentially for the respective start-stop channels, and means for setting said time base means to the state representative of the start-stop channel occupied by said supplementary switching combination in response to detection of said combination.

3. In a multiplex telegraphy system according to claim 2, said means for setting said time base means including detecting means for detecting the receipt of a supplementary switching combination and for producing a control pulse in response thereto, control means responsive to portions of said supplementary switching combination in said storage means and to said control pulse for generating pulse combinations representative of the start-stop channel occupied by said supplementary switching combination, and means for applying said generated pulses to said time base means in synchronization thereof.

4. In a multiplex telegraphy system according to claim 2, said supplementary switching combination including a plurality of pulses indicating the start-stop channel occupied by said combination, the fact that the combination is a supplementary switching combination rather than a normal source of information, and a switching signal for said start-stop channel.

5. In a multiplex telegraphy system according to claim 4, said means for setting said time base including control means for generating control pulse combinations in response to the pulses of said switching combination indicating the start-stop channel occupied, which pulse combinations represent the correct required state of said time base means reserved for said channel during the synchronous cycle, and further comprising means for applying said pulse combinations to said time base means in control thereof.

6. In a multiplex telegraphy system having a plurality of start-stop channels providing multi-bit information signals and switching signals embodying supervisory information, means for multiplexing said start-stop channels by time division into a single synchronous channel, and means for de-multiplexing said synchronous channel in synchronism with said multiplexing operation to reproduce said original start-stop channels, the improvement essentially consisting of means for effecting synchronization of said de-multiplexing operation, comprising:

means associated with said multiplexing means for inserting synchronizing signals in the form of a supplementary switching combination in place of said switching signals in said synchronous channel including at least one bit identifying said switching signal and only one bit position indicating that the channel contains a supplementary switching combination during the time allocated to a start-stop channel when that channel is in a switching state, said supplementary switching combination being advanced on the start-stop channels themselves, at the exclusion of a channel being reserved especially for this purpose, time base means for controlling the sequence of operation of said de-multiplexing means in accordance with predetermined states generated sequentially for the respective start-stop channels, and means for setting said time base means to the state representative of the start-stop channel occupied by said supplementary switching combination in response to detection of said combination.

7. The combination defined in claim 6, wherein said means for setting said time base means includes control means responsive to portions of said supplementary switching combination for generating pulse combinations indicating the start-stop channel occupied, which pulse combinations represent the correct required state of said time base means reserved for said channel during the synchronous cycle, and means for applying said pulse combinations to said time base means in control thereof.

References Cited

UNITED STATES PATENTS

| | | | |
|---|---|---|---|
| 2,786,892 | 3/1957 | Arbor et al. | 179—15 |
| 2,979,565 | 4/1961 | Zarcone | 178—50 |
| 3,020,337 | 2/1962 | Zarcone | 178—2 |

JOHN W. CALDWELL, *Acting Primary Examiner.*

ROBERT L. GRIFFIN, *Examiner.*

J. P. MOHN, W. S. FROMMER, *Assistant Examiners.*